Figure 1A:
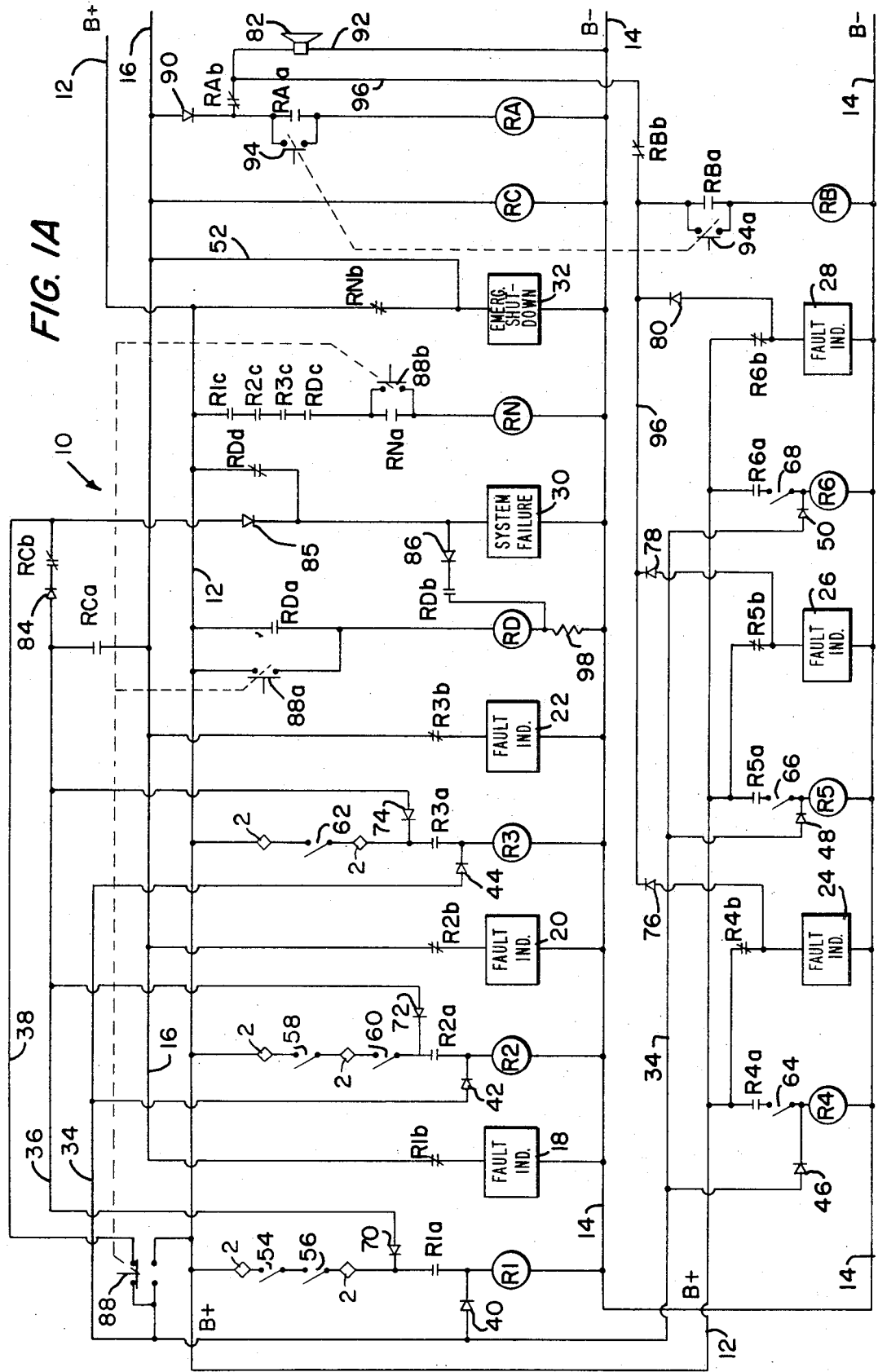

United States Patent [19]
Kipling

[11] 3,729,734
[45] Apr. 24, 1973

[54] FIRST FAULT ANNUNCIATOR SYSTEM

[75] Inventor: Rudyard William Kipling, Lennoxville, Quebec, Canada

[73] Assignee: Ingersoll-Rand Company, New York, N.Y.

[22] Filed: June 15, 1971

[21] Appl. No.: 153,329

[52] U.S. Cl. ............... 340/415, 340/213 R, 340/223, 340/409, 340/412
[51] Int. Cl. ............................................. G08b 19/00
[58] Field of Search ..................... 340/415, 412, 409, 340/223, 213 R

[56] References Cited

UNITED STATES PATENTS

| | | | |
|---|---|---|---|
| 3,264,613 | 8/1966 | Stolle | 340/415 |
| R24,031 | 6/1955 | Marmorstone | 340/415 |
| 3,527,987 | 9/1970 | Havlicek | 340/415 |
| 3,623,059 | 11/1971 | Rickerd | 340/213 R |

*Primary Examiner*—John W. Caldwell
*Assistant Examiner*—Robert J. Mooney
*Attorney*—Frank S. Troidl et al.

[57] ABSTRACT

Fault occurrence displaying system, for use with machinery, which automatically signals and initially displays only a first-occurring of perhaps several machine faults which occasion machine shut-down. The system includes means for automatically signaling and displaying both system failure and proper system functioning as well as means automatically operative to hold a fault signal on until manually turned off and means to hold successive fault signals inoperative until the first-occurring fault signal is silenced (i.e., turned off).

6 Claims, 2 Drawing Figures

LEGEND

| NORMALLY-CLOSED CONTACTS | NORMALLY-OPEN CONTACTS |
|---|---|
| R1a | R1b |
| R2a | R2b |
| R3a | R3b |
| R4a | R4b |
| R5a | R5b |
| R6a | R6b |
| RDa | RDd |
| RDb | RNb |
| RNa | RAa |
| R1c | RBa |
| R2c | RCa |
| R3c | |
| RDc | |
| RAb | |
| RBb | |
| RCb | |

*FIG. 1B*

FIRST FAULT ANNUNCIATOR SYSTEM

This invention pertains to fault annunciator systems for use with machinery, and in particular, to a system automatically operative for annunciating, initially, only the first-occuring fault. Further, this invention concerns a system, of the type noted, which is self-monitoring of its own acceptable performance.

In the prior art, there are known fault annunciator systems which indicate the first and all other faults which occasion machine shut-down. However, the known systems do not single out and produce, initially, only a first-occurring fault to the exclusion of all others which may occur immediately or subsequently thereafter. Also, the prior art systems generally are not self-monitoring to give a sensible announcement of the malfunction thereof.

Prior art annunciator systems lack means for disabling, or holding inoperative, second and subsequent fault annunciating indicators. Further, the known systems usually require two or more switching devices, such as relays or the like, to activate one fault indicator and signal the respective fault.

It is an object of this invention, then, to teach a first fault annunciator system which avoids the disadvantages, such as those just noted, known in the prior art systems of this type. A further object of this invention is to teach an annunciator system which is self-monitoring of its own acceptable performance. It is another object of this invention to teach a first fault annunciator system which positively prevents the annunciation of second and subsequent machine faults until a first-occurring and announced fault is corrected. It is yet another object of this invention to teach a first fault annunciator system comprising first means operative for producing discrete, sensible indications of discrete machine faults, second means coupled to said first means automatically operative in a first mode, in response to and upon an occurrence of a machine fault, for causing operation of said first means, and in a second mode, in response to the absence of a machine fault, for prohibiting operation of said first means, and third means coupled to said second means operative for producing a sensible indication of failure of the annunciator system, wherein said second means comprises means automatically operative, in response to a defective operation of said second means, to cause operation of said third means.

A feature of this invention comprises relays and visual fault indicators which are cooperative automatically to signal and initially display only a first-occurring of perhaps several machine faults which occasion machine shut-down. The system includes further relays and visual indicators for automatically signaling and displaying both a system failure and proper system functioning, as well as circuitry automatically operative to hold a fault indicator on until manually turned off, and circuitry to hold successive fault indicators inoperative until the first-occurring fault indicator is "-silenced" (i.e. turned off).

Further objects and features of this invention will become more apparent by reference to the following description taken in conjunction with the accompanying figures, in which:

FIG. 1A which is a schematic diagram of an embodiment of the novel first fault annunciator system, according to the invention and FIG. 1B, is legend of the relay contacts of FIG. 1A.

As shown in the figure, the system 10 comprises a B+ line 12, B— line 14, an alarm bus 16, and a plurality of fault indicators for visually displaying machine faults. These indicators 18, 20, 22, 24, 26, and 28 are operative to signal discrete troubles or faults which may occur in the machine — troubles or faults which may cause or warrant machine shut-down. A separate indicator 30 is provided in the system for signaling a break-down or failure of the system itself, to announce the system's inability to monitor machine faults, and another separate indicator 32 is provided for operation, in conjunction with given ones of the fault indicators, to establish, positively, that the system is functioning properly and that machine shut-down, or at least a signalling of a machine fault, was occasioned, in fact, by a machine fault, and not by a system failure.

A plurality of relays, R1 through R6, comprise the fault relays which are operative in one mode to hold the fault indicators inoperative, and operative in another mode to cause the indicators to display their discrete faults; the invention contemplates illuminable devices, for indicators 18, 20, 22, 24, 26, and 28, which will bear inscriptions such as: "low lube oil level", "low seal oil level", "low seal oil differential pressure", "high vibration", "gas detector failure", and the like, and such devices for indicators 30 and 32 in which these latter two will bear inscriptions such as "safety system failure", and "emergency shut-down", respectively.

Further relays, RD, RN, RC, RB, and RA respectively are: a system failure relay, a system functioning relay, an indicator powering relay, a horn relay, and a horn-silencing relay. The fault relays, R1 through R6 have associated therewith holding contacts: R1a through R6a, and also the system failure relay, RD, has holding contacts RDa associated therewith; the purpose of these holding contacts is explained in the ensuing text.

The system further comprises a reset line 34, an auxiliary bus line 36, and a reset diode failure line 38. Reset line 34 has associated therewith reset diodes 40, 42, 44, 46, 48, and 50 which, respectively, enable the re-energization of the relays R1 through R6 after they (i.e., any one thereof) have shut-down upon a machine fault having occurred.

The novel annunciator system further includes a shut-down indicator power line 52 provided for communicating the alarm bus 16 with B+ power. More, each of the fault relays R1-R6 has associated therewith one or two "machinery monitoring switches". The switches, the same being machine-borne, are introduced into the novel fault-annunciator system in that they are in series with the holding contacts, and are operative upon machinery failure of a nature which each switch monitors. For instance, as shown in the figure, machine-borne switches 54 and 56 are associated with relay R1. Only by way of example, it is suggested that switch 54 monitors a low oil level of a gas generator and opens, as shown, upon the occurrence of an excessively low oil level in such a generator. Switch 56 is represented as monitoring a low oil level of a power turbine, and also opens when there occurs an excessively low oil level in such a turbine. Relay R1 is normally energized when the machine, with which the system is monitoringly associated, is operating without fault. However, should either one of the low oil conditions arise, one of the switches, 54 or 56, would open causing a de-energizing of relay R1. Similarly then, switches 58 and 60, 62, 64, 66, and 68 monitor further machine faults. Respectively, these could be, for instance: low seal oil level, low seal oil differential pressure, high vibration, gas detector trouble, fire detector trouble, and natural gas leakage. Machine condition monitor terminals 2 (only a few of which are shown) provide points of connection for the system. Relays R1 through R3 are the significant first fault annunciating relays, and they are only representative of any number of machinery first-fault annunciating means. That is, there could be six, twelve, fifteen, or more such relays with their associated circuitry, for monitoring machine faults and singling-out and announcing the first-occurring thereof. Only three of such, R1, R2, and R3, are shown to simplify the explanation.

Relays R4 through R6 are also fault monitoring relays; they are not first-fault announcing relays, though, within the meaning or objects of the invention (whereas relays R1, R2, and R3 do meet the objects). Any one of these relays (R4, R5, or R6) will de-energize upon the occurrence of any one of the faults, respectively, which these three monitor, yet they have no circuitry operative to hold others thereof energized when any one of them de-energizes. Therefore, relays R1, R2, and R3 are represented as monitoring those fault conditions that might arise in a machine which are the more sensitive. These latter relays, R4 – R6, are operative to announce both the first-occurring and the subsequently-occurring machine faults, faults of a less critical nature, or faults more easily identified upon inspection of the machine.

To insure that relays R2 and R3 do not become de-energized, should it happen that R1 is de-energized, holding diodes 72 and 74 are provided. Diodes 72 and 74, by means of associated circuitry, will insure that relays R2 and R3 remain operative as relay R1 is "silenced". Conversely, diodes 70 and 74 will hold relays R1 and R3 operative if relay R2 is shut-down.

Diodes 76, 78, and 80 are horn diodes, associated with relays R4, R5, and R6, and are provided to cause a horn 82 to sound when there occurs any of the faults being monitored by relays R4 and R6. Finally, diodes 84, 85, and 86 are failure-line diodes provided to insure a path for B+ to the indicator 30, so that a failure of any of the reset or holding diodes will cause an illumination of indicator 30. A reset button 88 is provided, and mechanically linked with reset button contacts 88a and 88b, to return the system 10 to full monitoring operation after a fault has been corrected.

By way of explanation, the system operates as follows. Assuming that the machinery being monitored by the novel first fault annunciator system 10 is having no difficulties, relays R1 through R6 are energized and so also are relays RD and RN. Relays RC, RA, and RB are de-energized and remain so until some particular machinery fault or faults arise. Further, during faultless machine operation, switches 54, 56, 68, 60, 62, 64, 66, and 68 are normally closed, there being no machine difficulty which causes them to open. Relay contacts R1a through R6a as well as RDa and RNa, are closed to insure that the relays associated therewith are held energized. Relay contacts R1b through R6b, and R6b, and RNb and RDd are open during the machine's fault-less operation, to insure that none of the fault indicators nor indicators 30 or 32, becomes illuminated. Finally, relay contacts R1c through R3c and RDc are closed. These latter contacts, together with contacts RNa, insure that relay RN remains energized.

Assuming a machinery fault, such as low oil level in a gas generator, switch 54 will open. As a result, the circuit for relay R1 is opened and relay R1 becomes de-energized. Contacts R1a open, as a result of this, and remain open to insure that relay R1 will not come back on the line even if switch 54 should inadvertently close (before the fault which caused it to open had been corrected). The indicator 18 associated therewith will be connected to the alarm bus 16 because the contacts R1b associated with relay R1 have closed; it is only energization of relay R1 which holds them open. Closed contacts R1b complete the path for indicator 18 to the alarm bus 15, however, instantaneously, alarm bus 16 has no power. It will be noted, though, that relay R1 is operative of contacts R1c associated with relay RN. Relay contacts R1c have now opened, with the de-energizing of R1, and de-energized relay RN. With the de-energizing of relay RN contacts RNb have closed, as only energization of RN held them open, and complete a connection from B+ line 12 through power line 52 to the alarm bus 16. Accordingly, indicator 18 will illuminate; so also does indicator 32 illuminate and signal a proper functioning of the system 10. Indicators 20 and 22 will not become illuminated, because the B+ supply is maintained on relays R2 and R3 by way of diodes 72 and 74. This B+ supply is provided to relays R2 and R3 as follows: powering of the alarm bus 16 caused an energization of relay RC. As a result, contacts RCa closed completing a path therethrough from bus 16 to auxiliary bus 36. Powering of line 36 passes B+ to diodes 70, 72, and 74. The latter two diodes hold relays R2 and R3 energized; diode 70, of course, cannot cause relay R1 to re-energize however, as the holding contacts, R1a, are open. Accordingly, only one fault, the first-occurring fault, "low oil level in a gas generator", occasioned a signaling of the one indicator 18 and all other discrete fault indicators remain inoperative.

When the first-occurring fault has been corrected, and the machinery being monitored may return to line operation, the system 10 is returned to its monitoring function by means of reset button 88. By depressing reset button 88, the B+ line 12 is connected with reset line 34 to communicate with the diodes 40, 42, 44, 46, 48, and 50 to bypass the holding contacts R1a – R6a, to re-energize whichever one of the relays, R1 through R6, was de-energized. Mechanically linked contacts 88a and 88b also operate, together with button 88, to bypass the holding contacts RDa and RNa and couple the relays RD and RN to B+ line 12 — so that these relays will re-energize.

Relays R4 through R6, as noted, individually make their own responses to faults which they are monitoring. Like relays R1 through R3, relays R4 through R6 are de-energized by the opening of switches 64, 66, or 68. Each of the relays R4 through R6 also have holding contacts R4a through R6a. However, they do not have associated therewith holding diodes similar to diodes 70, 72, and 74. Therefore, if relay R4 becomes de-energized, there is no circuitry to maintain relays R5 and R6 in energized condition. Subsequent faults, of which they are monitors, will cause them to de-energize as well.

My novel annunciator system 10 incorporates means automatically responsive to a machine fault for emitting an audible alarm. Horn 82 is provided for this purpose, and sounds, automatically, as soon as alarm bus line 16 becomes powered. As noted earlier, a machine fault de-energizes one of the firstfault annunciator relays R1, R2, or R3. The relay de-energization opens the respective contacts R1c, R2c, or R3c to de-energize relay RN. The de-energization of relay RN closes contacts RNb to communicate B+ line 12 with line 52 and therethrough to alarm bus line 16. Also, B+ is communicated via a diode 90 through closed contacts RAb to line 92 and horn 82. Contacts RAb are closed due to the fact that relay RA is de-energized. Contacts RAa are open, and hold relay RA in de-energized condition unless the horn silencing pushbutton 94 is depressed. Pushbutton 94 bypasses the holding contacts RAa to apply B+ from now-powered alarm bus line 16, to the relay RA to energize same. Upon becoming energized, relay RA opens contacts RAb, and the horn 82 is turned off.

Horn 82 also sounds if one of the relays R4, R5, or R6 becomes de-energized. The B+ from line 12 is conducted via one of the diodes, 76, 78, or 80 to a line 96; line 96 is close-circuited with horn 82, by closed contacts RBb. As noted in connection with relay RA, relay RB is de-energized also, causing contacts RBb to be closed. Again, to silence the horn 82, it is necessary to depress pushbutton 94; this will actuate the associated and mechanically-coupled horn silencing pushbutton contacts 94a to bypass B+ around holding contacts RBa. Resultingly, relay RB energizes and opens contacts RBb.

This novel system 10 monitors its own acceptable operational condition in having means responsive to failure of any one of the reset diodes 40, 42, 44, 46, 48, or 50, or any one of the holding diodes 70, 72, or 74 to do the following: 1. power (i.e., illuminate) indicator 30, 2. power (illuminate) indicator 32, and 3. sound the horn 82. These events occur as follows: failure of diode 42, for instance, in the reverse direction, will communicate B+ with line 38 via switches 58, and 60, contacts R2a and pushbutton 88. Line 38 is in series with diodes 85 and 86 and the closed contacts RDb; indicator 30 is in parallel with diode 86 and contacts RDb. Thus, indicator 30 illuminates, and relay RD, for having no differential in potential thereacross, deenergizes. Contacts RDa open, holding relay RD de-energized, and contacts RDd close to effect direct communication of indicator 30 with the B+ from line 12, and to hold indicator 30 illuminated. Also, with de-energizing of relay RD, contacts RDc open to de-energize relay RN. De-energization of relay RN closes contacts RNb to cause: illumination of indicator 32, powering of bus line 16, and the powering of line 92 to cause the sounding of horn 92.

Only indicators 30 and 32 will illuminate, because contacts RCa close, with energization of relay RC, to transmit B+ to the diodes 70, 72, and 74 via alarm bus line 16 and auxiliary bus line 36.

With this arrangement, to prevent a shorting of B+ to B−, I provide a load resistor 98 between relay RD and B− line 14.

My system monitors failure of holding diodes 70, 72, and 74 by transmitting B+ through the failing diode to closed contacts RCb to diode 86. Thereafter the same sequence of events, as just reviewed, takes place, to wit: illumination of indicators 30 and 32, the sounding of horn 82, the retention of relays R1 through R3 in energized condition, and the nonillumination of indicators 18, 20, and 22 (nor of indicators 24, 26, and 28 — assuming no machine faults of their monitoring).

The holding diode failure monitoring arrangement, it will be noted, involves the energization of relay RC and a resulting opening of contacts RCb. However, contacts RCa close, with energization of relay RC, to hold B+ on diodes, 70, 72, and 74 to insure a maintained energization of relays R1, R2, and R3.

While I have described my invention in connection with a specific embodiment thereof, it is to be clearly understood that this is done only by way of example and not as a limitation to the scope of my invention as set forth in the objects and in the appended claims.

I claim:

1. A first fault annunciator system, for use with a machine, comprising:

a plurality of indicators for producing discrete, sensible indications of discrete machine faults;

first means coupled to said indicators automatically operative, in response to and upon an occurrence of a machine fault, for causing operation of one of said indicators which is indicative of the occurred fault;

said first means including switching means operative in response to the absence of machine faults for prohibiting operation of all indicators of said plurality; wherein said first means further includes unidirectional-current devices operative upon an occurrence of a machine fault for prohibiting operation of all indicators other than said one indicator; and second means coupled to said first means operative for producing a sensible indication of failure of said annunciator system; and wherein said first means includes means cooperative with said switching means automatically operative in response to a defective operation of one of said devices to cause operation of said second means.

2. A system, according to claim 1 wherein:

said first means include at least one normally-energized relay, said one relay having first normally-closed contact means, in series with said switching means, cooperative to hold said one relay energized, and having second normally-open contact means in series with at least one of said indicators to hold said one indicator inoperative.

3. A system, according to claim 2, further including:

indicator means operative for producing a sensible indication of proper system functioning;

said indicator means being normally inoperative;

third normally-open relay contact means, in series with said latter indicator means for holding same inoperative;

a source of potential connected with said third relay contact means; and a second normally-energized relay having, and being connected to said source through, fourth normally-closed relay contact means cooperative to hold said second relay energized; wherein said one relay is operative of said fourth relay contact means, causing the latter to open upon said one relay being de-energized and causing said second relay to de-energize;

said second relay is operative of said third relay contact means, causing the latter to close upon said second relay being de-energized and causing said third relay contact means to conduct potential from said source to said indicator means to cause the latter to operate.

4. A system, according to claim 3, further including:

an alarm bus line;

an auxiliary bus line connected to said unidirectional current devices;

fifth normally-open relay contact means intercoupling said alarm and auxiliary bus lines;

a power line connected to both said third relay contact means and said indicator means and to said alarm bus line; and a third normally de-energized relay connected to said alarm bus line; wherein said third relay is operative of said fifth relay contact means;

said third relay is energized through said power line upon closing of said third relay contact means to cause said fifth relay contact means to close, to power said auxiliary bus line, and to hold said all other indicators operative via operation of said devices.

5. A system, according to claim 3, further including:

second indicator means operative for producing a sensible indication of system failure or improper system functioning;

said second indicator means being normally inoperative; and wherein said devices comprise at least one such device having an anode commonly coupled to both said one relay and said source of potential, and having a cathode serially connected with said second indicator means;

said one such device, upon failure thereof in a reverse current direction, being effective to conduct potential from said source to said second indicator means to cause the latter to operate.

6. A fault annunciator system, for use with a machine, comprising:

a plurality of indicators for producing discrete, sensible indications of discrete machine faults;

first means coupled to said indicators automatically operative in response to and upon an occurrence of a machine fault, for causing operation of one of said indicators which is indicative of the occurred fault;

said first means including switching means operative in response to the absence of machine faults for prohibiting operation of all indicators of said plurality; and second means coupled to said first means operative for producing a sensible indication of failure of said annunciator system;

wherein said first means includes means cooperative with said switching means automatically operative in response to a defective operation of one of said devices to cause operation of said second means.

* * * * *